United States Patent [19]

Blaushild

[11] Patent Number: 5,024,804
[45] Date of Patent: Jun. 18, 1991

[54] SWINGING SUPPORT FOR NUCLEAR POWER PLANT PRESSURIZER VALVES

[75] Inventor: Ronald M. Blaushild, Export, Pa.

[73] Assignee: Westinghouse Electric Corp., Pittsburgh, Pa.

[21] Appl. No.: 383,392

[22] Filed: Jul. 21, 1989

[51] Int. Cl.$^5$ .............................................. G21C 13/00
[52] U.S. Cl. ..................................... 376/285; 376/461
[58] Field of Search ............... 376/285, 461, 463, 287; 220/646, 647, 436, 437, 85 P; 248/315, 213.2

[56] References Cited

U.S. PATENT DOCUMENTS

| | | | |
|---|---|---|---|
| 4,426,350 | 1/1984 | Zegar et al. | 376/463 |
| 4,576,788 | 3/1986 | Blaushild | 376/463 |
| 4,629,601 | 12/1986 | Blaushild | 376/463 |

Primary Examiner—Daniel D. Wasil
Attorney, Agent, or Firm—Michael G. Panian

[57] ABSTRACT

A support system is provided for a pressurizer relief and safety valve system in a nuclear power plant. The pressurizer has a generally cylindrical vessel wall topped with a dome-like member. The valve system includes a manifold generally located above and extending about the periphery of the vessel wall of the pressurizer.

The valve support system comprises a plurality of paired lug members that extend outwardly from and are secured to the vessel wall at points spaced around the wall periphery. V-shaped columnar supports extend vertically upward from each of the lug pairs to the valve system manifold.

A structural pin extends in the horizontal direction to support a base portion of each of the columnar supports relative to the associated lug pair. Disengageable locking clamps secure the pin to the lugs. A pair of diagonal columns extend upwardly in a V-shape from the support base portion to the manifold. A crossbar connects the diagonal columns at the top of each columnar support.

Three collars units are secured to and project downwardly from the manifold for securance of the manifold to the crossbars of the columnar supports.

When the pin locking clamps are disengaged to enable pin removal, the associated columnar support can be pivoted about its upper crossbar and swung outwardly from the vessel.

5 Claims, 5 Drawing Sheets

FIG.I.

SWINGING SUPPORT FOR NUCLEAR POWER PLANT PRESSURIZER VALVES

BACKGROUND OF THE INVENTION

The present invention relates to nuclear power plants and more particularly to systems for supporting a pressure relief and safety valve system above a pressurizer vessel in a pressurized water nuclear power plant.

A pressurizer vessel is used in a pressurized water nuclear reactor power plant to provide relief for plant coolant overpressure. Usually, such a pressurizer vessel is a vertical, thick walled unit having a hemispherical top or dome, and having its bottom end supported by a flanged skirt.

Relief valves provide a first level of overpressure protection and safety valves provide a second or backup level of overpressure protection. The pressurizer relief and safety valve system includes a manifold or header assembly and piping connections to nozzles in the head of the pressurizer and to discharge outlets. One situation where overpressure protection is needed, for example, is where the entire plant electrical load has been dumped because of electrical operating conditions.

The entire pressurizer valve system must be safely and reliably supported above the pressurizer in accordance with plant safety and performance standards. In earlier plant designs, valve support systems were excessively costly because the valve support system designs were plant dependent.

Subsequently, a basic valve support system was developed for use as a standardized scheme for supporting pressurizer valves and piping in variously designed pressurized water reactor plants. That basic support system is disclosed in U.S. Pat. No. 4,426,350 entitled VALVE SUPPORT ARRANGEMENT FOR PRESSURIZED IN NUCLEAR POWER PLANT, issued to M. J. Zegar et al. on Jan. 17, 1984 and assigned to the present assignee.

In the Zegar patent, an arrangement for supporting the pressurizer safety and relief valve system is described including a common header supported relative to the side walls of the pressurizer vessel by the use of columnar supports secured to the header and to the pressurizer side wall by the use of lug means. The lug means are attached to the pressurizer side wall and must be capable of supporting the load of the columnar supports and pressurizer safety and relief valve system.

One disadvantage of Zegar support system was that the vessel support lugs had to be large to avoid overstressing from some combinations of load forces under various operating conditions. The vessel wall itself is thus undesirably subjected to heavy load forces under various conditions.

Generally, rigid valve system support is required for dynamic forces such as those stemming from an earthquake. At the same time, flexible support is required to accommodate thermal growth or contraction of the valve system due to changing temperature conditions. The transmittal of large load forces to the vessel lugs in Zegar occurs because all vertical and horizontal load forces and moments about all three reference axes are transmitted to the vessel support lugs.

Continuing development effort accordingly led to subsequent improvements as set forth in U.S. Pat. No. 4,576,788 entitled STRADDLE-TYPE SUPPORT STRUCTURE FOR NUCLEAR POWER PLANT PRESSURIZER VALVES, issued to R. M. Blaushild on Mar. 18, 1986 and assigned to the present assignee and U.S. Pat. No. 4,629,601 entitled STIRRUP-TYPE SUPPORT STRUCTURE FOR NUCLEAR POWER PLANT PRESSURIZER VALVES, issued to R. M. Blaushild on Dec. 16, 1986 and assigned to the present assignee.

In the straddle-type valve support system, the vessel lugs are subjected only to horizontal forces which tend to rotate the lower support ring on which columnar valve supports rest. All other load forces are applied to arcuate sections that interconnect the lower and upper support rings, thereby distributing such forces over the vessel head surface. Heavy loading of the vessel lugs is eliminated, but much more extensive support structure is required and accessibility for inspecting vessel welds is difficult and time consuming.

In the stirrup-type valve support system, some improvement is achieved in lug loading through even distribution of loading forces from the columnar supports to the vessel lugs through a ring girder. The columnar supports are secured to the girder at points spaced from the points at which the girder is secured to the vessel lugs thereby enabling the lug loading forces to be distributed more evenly.

While disassembly of the stirrup-type girder-vessel lug securance is facilitated to enhance vessel head accessibility for weld inspection, overall vessel head access for weld inspections is still difficult and time consuming because of the visual obstruction presented by the relatively complex valve support system structure with the valve support system left in place or, alternatively, because of the overall difficulty of support structure disassembly for more open access to the vessel head.

In all of the prior art pressurizer valve support systems there has been little or no provision for accommodating unit to unit manufacturing differences such as vessel lug hole locations, etc.

There has accordingly continued to be a need for further improvement in the support of a pressurizer safety relief valve system in nuclear power plants. The present invention is directed to achieving significant improvement in pressurizer valve support systems through simpler, more economic structure that provides better vessel head accessibility for weld inspections while meeting valve support safety and performance requirements.

SUMMARY OF THE INVENTION

An arrangement is provided for supporting a relief and safety valve system for a pressurizer in a nuclear power plant. The pressurizer has a generally cylindrical vessel wall topped with a dome-like member. The valve system includes a manifold generally located above and extending about the periphery of the vessel wall of the pressurizer.

The valve supporting arrangement comprises a plurality of lug means extending outwardly from and secured to the vessel wall at points spaced around the wall periphery. Columnar support means extends generally vertically upward from each of the lug means to the valve system manifold.

A first elongated and generally cylindrical structural member extends generally in the horizontal direction to support the lower end of each of the columnar support means relative to the associated lug means. A plurality of collar means project downwardly from the manifold for securance of the manifold to the columnar support means.

A second elongated and generally cylindrical structural member extends generally in the horizontal direction to support the upper end of each of the columnar support means relative to the associated manifold collar means. One of the elongated structural members of each of the columnar support means is disengageable from its securance so that each of the columnar support means can be pivoted about its other elongated structural member and swung outwardly from the vessel.

DESCRIPTION OF THE PREFERRED EMBODIMENT

Figure 1:
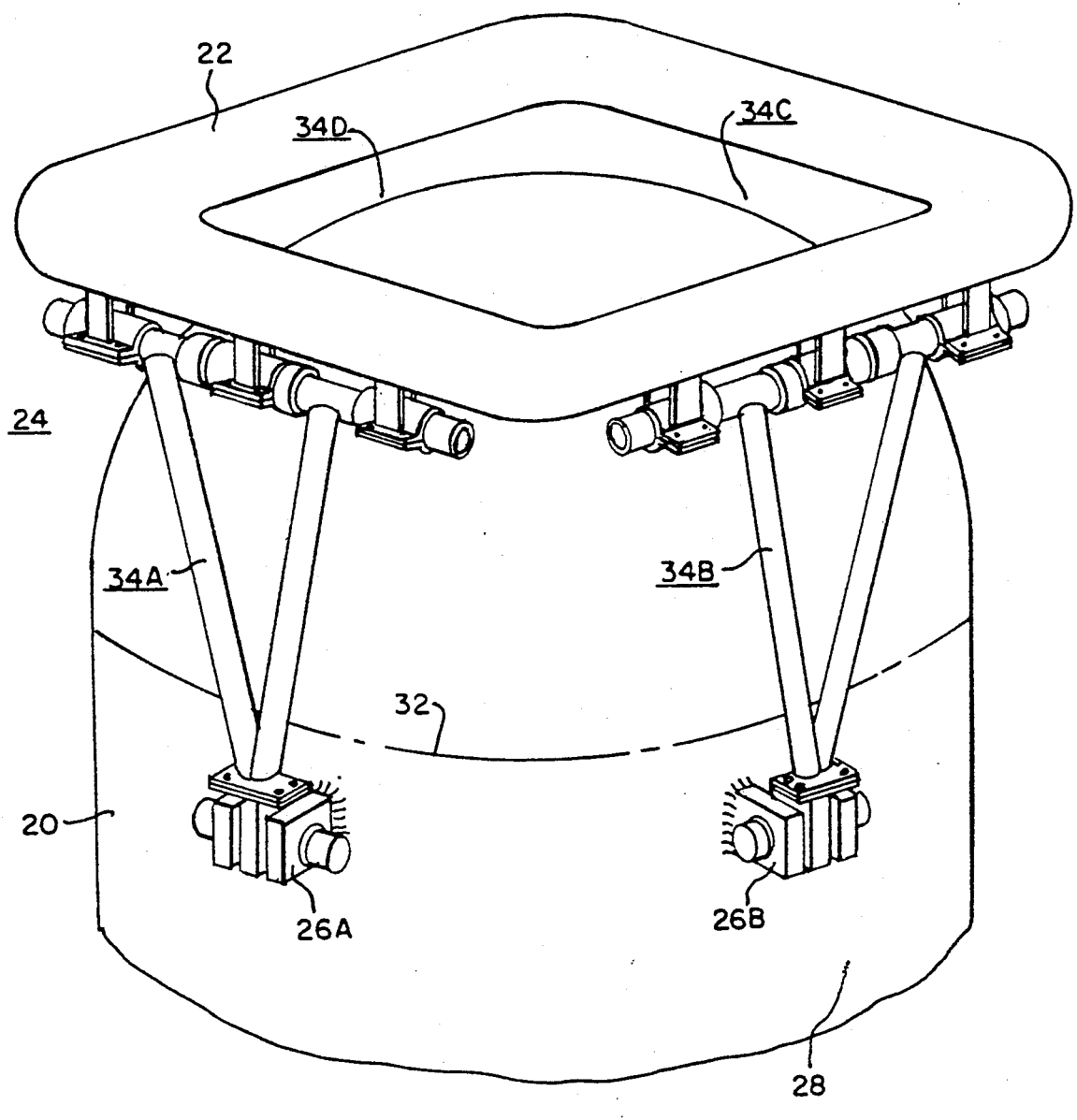
FIG. 1 is a schematic perspective view of nuclear power plant pressurizer with a relief and safety valve support system arranged in accordance with the invention.

More particularly, there is schematically shown in FIG. 1 a pressurizer 20 employed in a pressurized water nuclear power plant for reactor coolant pressure regulation. A manifold 22 is supported above the pressurizer 20 as part of a relief and safety valve system (not shown) for the pressurizer 20.

The relief and safety valves and associated piping (not shown) which is connected to nozzles (not shown) on top of the pressurizer 20, to the manifold 22, to the valves and to an overflow vessel (not shown) are supported on the manifold 22. The relief and safety valve system 23 can include valves and piping, for example, like that shown in the drawings of referenced U.S. Pat. No. 4,426,350.

A valve support system 24 is arranged in accordance with the invention to support the manifold 22 and the rest of the valve system 23. As set forth in U.S. Pat. No. 4,426,350, it is arranged to provide certain basic objectives including valve support against steam outflow discharge forces, system integrity against earthquake forces transmitted from ground-based structure, limited space layout of system consistent with facilitated valve maintenance and limited radiation exposure time, cost economy, and modularization that facilitates field assembly.

It is highly desirable that a pressurizer relief and safety valve support system be structured simply with operating characteristics that meet safety and performance requirements while achieving better manufacturing economy and enhanced service accessibility for vessel weld inspections and other servicing requirements. The valve support system 24 is characterized with such improvement in accordance with the invention.

The valve support system 24 includes a plurality of supporting lug pairs 26A, 26B, 26C and 26D welded to and equally spaced about a sidewall 28 of the pressurizer vessel 20 below the horizontal reference plane 32 where the sidewall 28 is welded to a dome 30 of the pressurizer 20. Generally, the force and moment loading of the valve and valve support systems is carried by the support lugs. However, as a result of the operation of the invention, the support lugs carry significantly less stress and therefore can be substantially downsized as compared to the prior art.

The valve system 23 is supported above the lugs 26A-26D by respective columnar supports 34A-34D which are preferably V-structured. Thus, each columnar support (FIG. 2) includes a top crossbar 36 and a pair of diagonal columns 38 and 40 that extend upwardly from a base 42 in a V-shape. The columnar supports are simpler in structure than prior art schemes to provide greater service accessibility yet safety and performance requirements are met as well or better than such requirements are met by the prior art. The support column simplification is achieved at least partly because of the improved structural support enabled by application of the invention.

The crossbar 36 and the columns 38 and 40 are preferably formed from tubular stainless steel with sufficient specifications to carry the loading involved with substantial safety margin. These elements are welded together as indicated by the reference characters 44, 46, and 48 and to the base 42 as indicated by 50.

As shown in FIGS. 2-7, each support crossbar 36 is secured to the manifold 22 by collars 52, 54, and 56 having upper members respectively welded to the bottom side of the manifold 22. Generally, the inner collar 54 withstands horizontal loading along the crossbar axis. The two outer collars 52 and 56 withstand vertical loading while allowing for differential thermal expansion of the manifold 22 and the support crossbar 36, i.e. sliding movement of the crossbar 36 relative to the outer collars 52 and 56.

The outside collars 52 and 56 are each provided with a first fixed collar member 51 welded to the underside of the manifold 22 and a second collar member 53 that is bolted to the collar member 51 to secure the inwardly located columnar support crossbar 36 in place.

The collar 54 is located between the outer collars 52 and 56 and similarly includes a fixed collar member 55 welded to the underside of the manifold 22 and a second collar member 57 that is bolted to the collar member 55. Respective web members 47 and 49 strengthen the securance of the collar members 51 and 55 to the manifold 22. During assembly, the crossbar 36 is located against the three fixed collar members 51 and 55 and the three collar members 53 and 57 are bolted to the fixed collar members 51 and 55 to lock the crossbar 36 against vertical movement while permitting outward swinging movement of the columnar support 34 and while permitting sliding horizontal expansionary or contractive movement of the crossbar 36 relative to the outside collars 52 and 56.

With crossbar/collar assembly completed, collar stops 54A and 54B are preferably welded to the crossbar 36 on opposite sides of the inner collar 54 to lock the crossbar 36 against unitary sliding horizontal movement relative to the collars 52, 54 and 56. With this arrangement, basis support functions are realized while subsequent columnar support disassembly is facilitated, i.e. the three collar members 53 and 57 are unbolted and the crossbar can be lowered and free from its secured position.

The base portion 42 of each columnar support preferably includes a base plate 58 that is welded to the bottoms of the diagonal columns 38 and 40 as previously indicated. A base block 59 is also provided with a plate 60 that is securely bolted to the base plate 58. If necessary, shim plates can be disposed between the plates 58 and 60 prior to plate securance to take up dimensional differences.

The columnar base portion 42 is secured to the vessel lug pair by a structural pin 62. During valve support system assembly, the pin 62 is inserted through a first lug member 63 of the vessel lug pair, then through an opening 64 in the support base block 59, and finally through the second lug member 65 of the vessel lug pair. A pair of clamp units 66 are secured by bolts and nuts 68 in respective grooves 70 and 72 which respectively lie outside the lug members 63 and 65.

With the pin 62 thus locked in place, the columnar support 34 is held substantially upright with the base block 59 against the vessel wall and it is further held against horizontal displacement by the lug members 63 and 65 and the pin 62. When all four of the columnar supports 34 are locked onto the vessel lug pairs, the valve system manifold 22 is disposed on the columnar supports 34 and the collars 52, 54 and 56 are secured about the support crossbars 36. Thereafter, the valves and piping and other apparatus may be installed to complete the supported relief and safety valve system 23.

Figure 2:
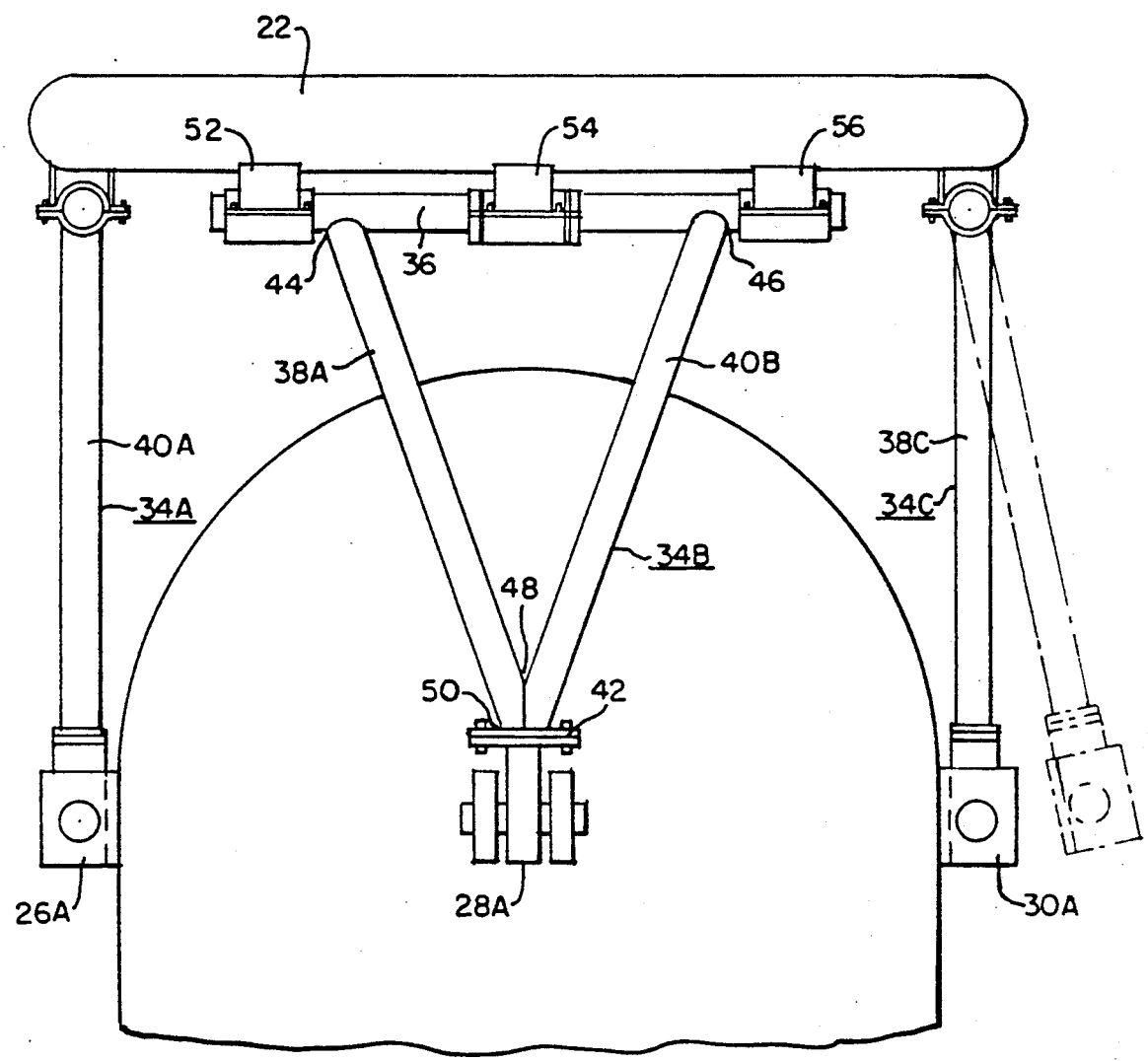
FIG. 2 is a partial schematic elevational view of the apparatus shown in FIG. 1.

Once the nuclear power plant has been placed in operation and is thereafter shut down for servicing, servicing of the valve system 23 and weld inspection access to the vessel wall and dome are facilitated by the reduced obstruction presented by the relatively simplified valve support system structure and especially by a swingout capability of the individual columnar supports 34. Thus, as shown in FIG. 2 for the support 34C, the columnar support can be swung outwardly and upwardly once the pin clamps 66 and the pin 62 have bee disassembled. Swing out action is easily achieved because of the rotative relationship of the crossbar 36 to its bearing support collars 52, 54 and 56. As previously noted, the columnar support can even be completely removed if desired.

Normally, the columnar supports 34 would be swung away from the vessel wall and done one at a time. While each support is suitably held in its swing out position, unobstructed access is provided for service personnel to make vessel weld inspections over the uncovered nearby vessel surface area, i.e. the vessel surface over about the one quarter of the vessel periphery uncovered by the swung out columnar support. In addition, unobstructed service access is provided to the underside of the valves and piping.

Overall, the invention results in reduced time and labor for assembly, disassembly and service and in reduced radiation exposure to service personnel. Just as importantly, reduced loading is applied to the vessel lugs thereby enabling the use of smaller lugs with reduced stressing of the vessel wall. Further, greater flexibility is provided for making adjustments needed during installation to take up structural dimensional variations from system to system.

Figure 8:
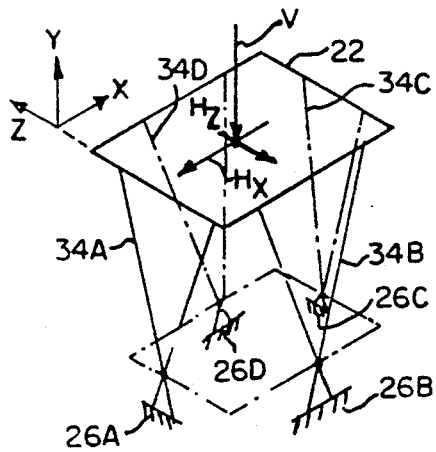
FIGS. 8-11 show various force and moment diagrams illustrating the basis upon which the valve support system operates.

The principles of force interaction which characterize the operation of the invention and lead to many of the described improvements are graphically illustrated by the free body diagrams in FIGS. 8-11. In FIG. 8, a diagrammatic representation is shown for the valve system and its support structure and the manner in which basic forces are applied to the supports. Thus, the valve system manifold 22 is shown on its columnar supports 34A-34D. Reference axes X, Y and Z are also shown. As indicated, the manifold 22 may apply translated horizontal forces Hx and/or Hz (resulting from valve thrust) to the columnar supports. Vertical force V may also be applied by the manifold 22 to the columnar supports in the direction of the Z-axis.

Figure 10:
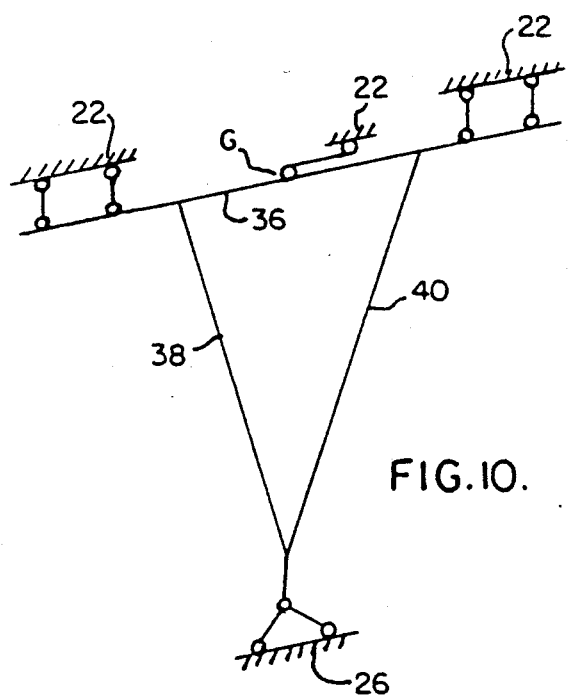

FIG. 10 shows one of the manifold supports and the supporting relationship it has to the manifold and its supporting lug pair 26. Thus, the support crossbar 36 is rigidly connected to the manifold at its midpoint G but is free to contract and expand in the horizontal direction outwardly from the crossbar midpoint (crossbar sliding in the collar end supports). As shown, the ends of the crossbar 36 are rigidly held against vertical movement, but are supported for limited parallel horizontal swinging movement relative to the manifold 22 and further for outward swinging movement of the columnar support from the plane of the drawing for pressure vessel maintenance as previously described. At the base of the columnar support, the lug pair 26 holds the columnar support fixed against horizontal forces Hx or Hz as the case may be as well as vertical forces V, but the columnar support can swing outwardly from the plane of the drawing (about the pin 62).

Figure 9:
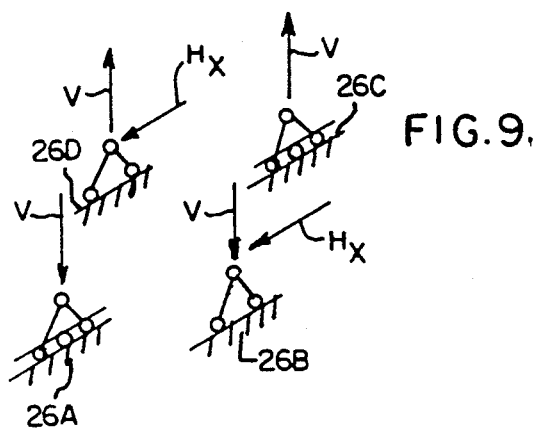
Figure 11:
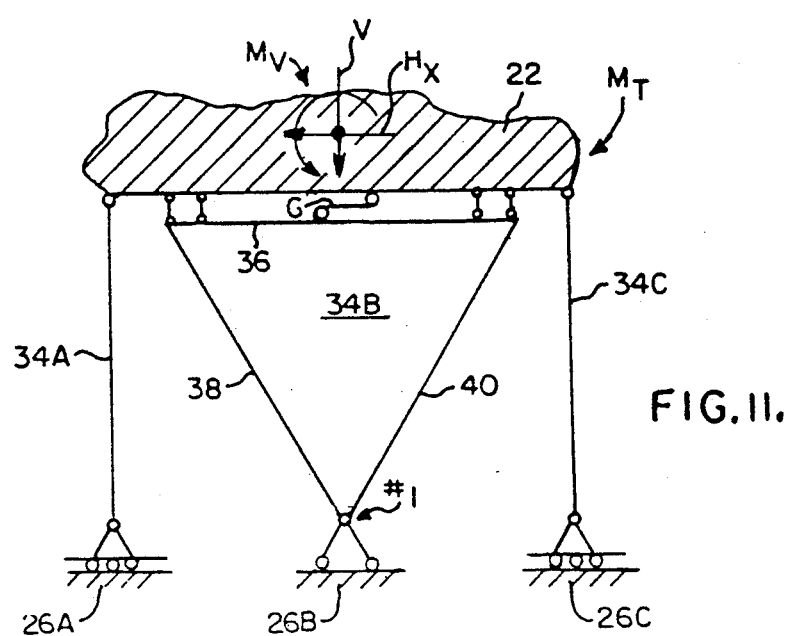

FIGS. 9 and 11 illustrate all of the supporting lugs together and the application of manifold forces to them. With reference to FIG. 11, vertical force V is taken by all four columnar supports 34A-34D and transferred taken by al four columnar to all of the lugs 26A-26D. Horizontal force Hx is taken by crossbar midpoint G (of support 34B or 34D) and transferred by diagonal columns 38 and 40 to the lug pair 26B or 26D.

A vertical manifold movement Mv in a vertical plane along the X-axis is taken by a vertical reaction of supports 34A and 34C with 34A in compression and 34C in tension for the illustrated moment. A horizontal thrust Hz is taken by a horizontal reaction of supports 34A and 34C. The supports 34B and 34D similarly react for a horizontal thrust Hx or a vertical movement Mv in a plane along the Z-axis.

Generally, the columnar supports rigidly withstand vertical moments or horizontal forces without bending or tilting and thus react to applied forces with tension or compression. For example, the moment Mv in FIG. 11 produces tension in the support 34C and the diagonal 40 of the support 34B, and it produces compression in the support 34A and the diagonal 38 of the support 34B. As a consequence of the avoidance of support bending, the manifold 22 is always held in a horizontal plane.

In contrast, the prior art typically involves the application of bending moments to the supports with resulting support deflection and manifold tilting. In turn, the bending moments are transferred to the supporting lugs, where excessive lug loading occurs as a result of the twisting action applied to the lugs.

As shown for the lug pairs 26A and 26C, radial thermal growth of the pressure vessel in the X direction results in outward movement of the lug pairs with the associated columnar support pivoting about the lug pin without obstruction. Lug pairs 26B and 26D react similarly for radial pressure vessel thermal growth in the Y direction.

In FIG. 9, the lug pairs 26B and 26D react rigidly against horizontal forces Hx. Similarly, for horizontal forces Hz, the lug pairs 26A and 26C rigidly prevent system displacement. All four lug pairs react rigidly against moments or forces in vertical planes.

From a support performance standpoint, the invention accordingly employs a relatively simplified valve system support structure which reacts very efficiently and effectively to manifold load forces and thermal growth forces so that significantly reduced loading is applied to the supporting lugs. Thus, structural advantages are realized in addition to vessel maintenance and other operating advantages.

Particularly, vertical forces are taken in the middle of the lug pin at a point so close to the pressure vessel wall that the forces applied to the lugs are essentially shear forces with no significant bending moment on the lugs.

Horizontal forces are applied against one lug member of the lug pair from the base of the columnar support through a washer (not specifically indicated). Thereafter, the horizontal forces are transferred to the retaining ring for that lug member and then to the pin and through the pin to the retaining ring at the opposite end of the pin and finally to the other lug member. The lug members thus share in the reaction to horizontal forces which are applied thereto essentially as shear forces.

Figure 12:
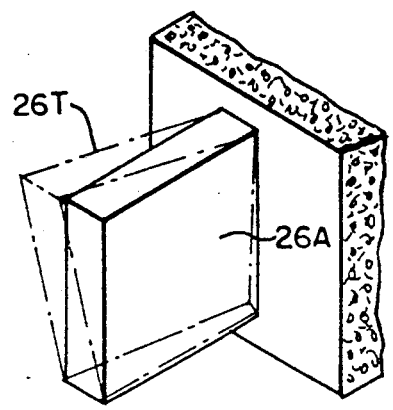
FIG. 12 shows typical bending action on prior art vessel support lugs.
Figure 3:
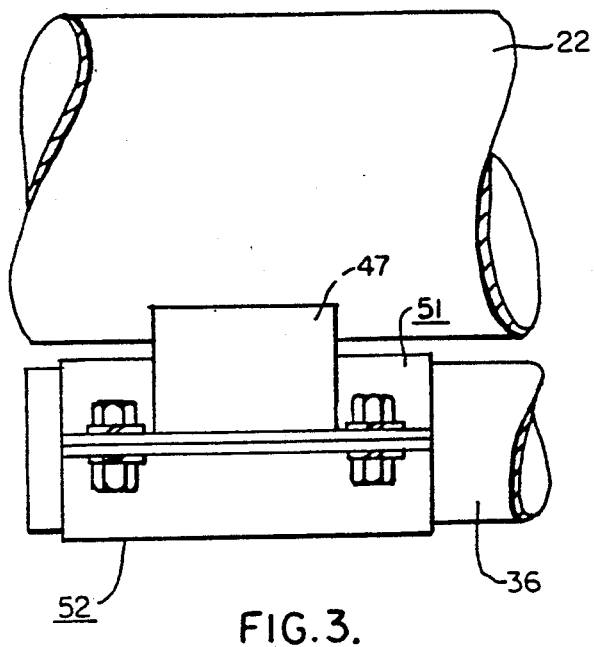
FIGS. 3-6 show enlarged broken away views and sections therethrough illustrating securance of the system manifold to columnar supports.
Figure 4:
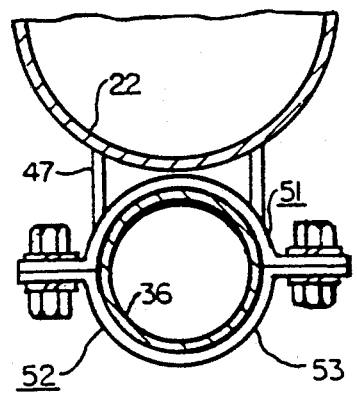
Figure 5:
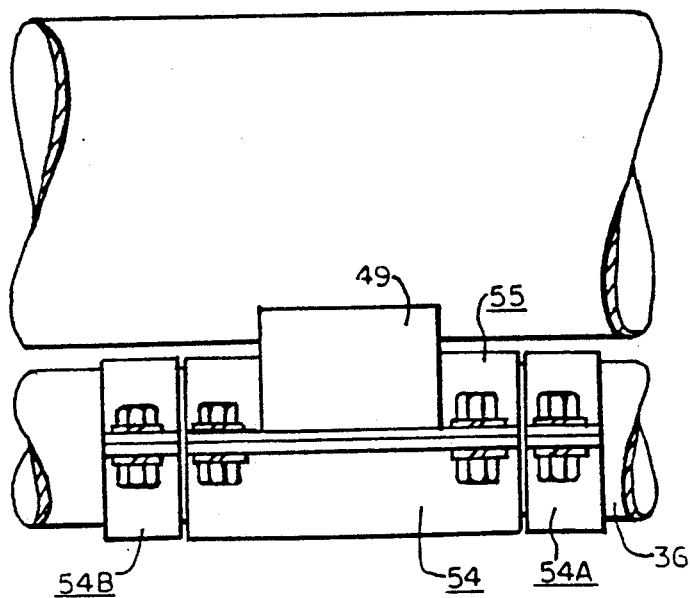
Figure 6:
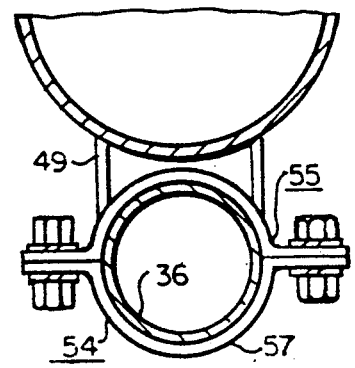
Figure 7:
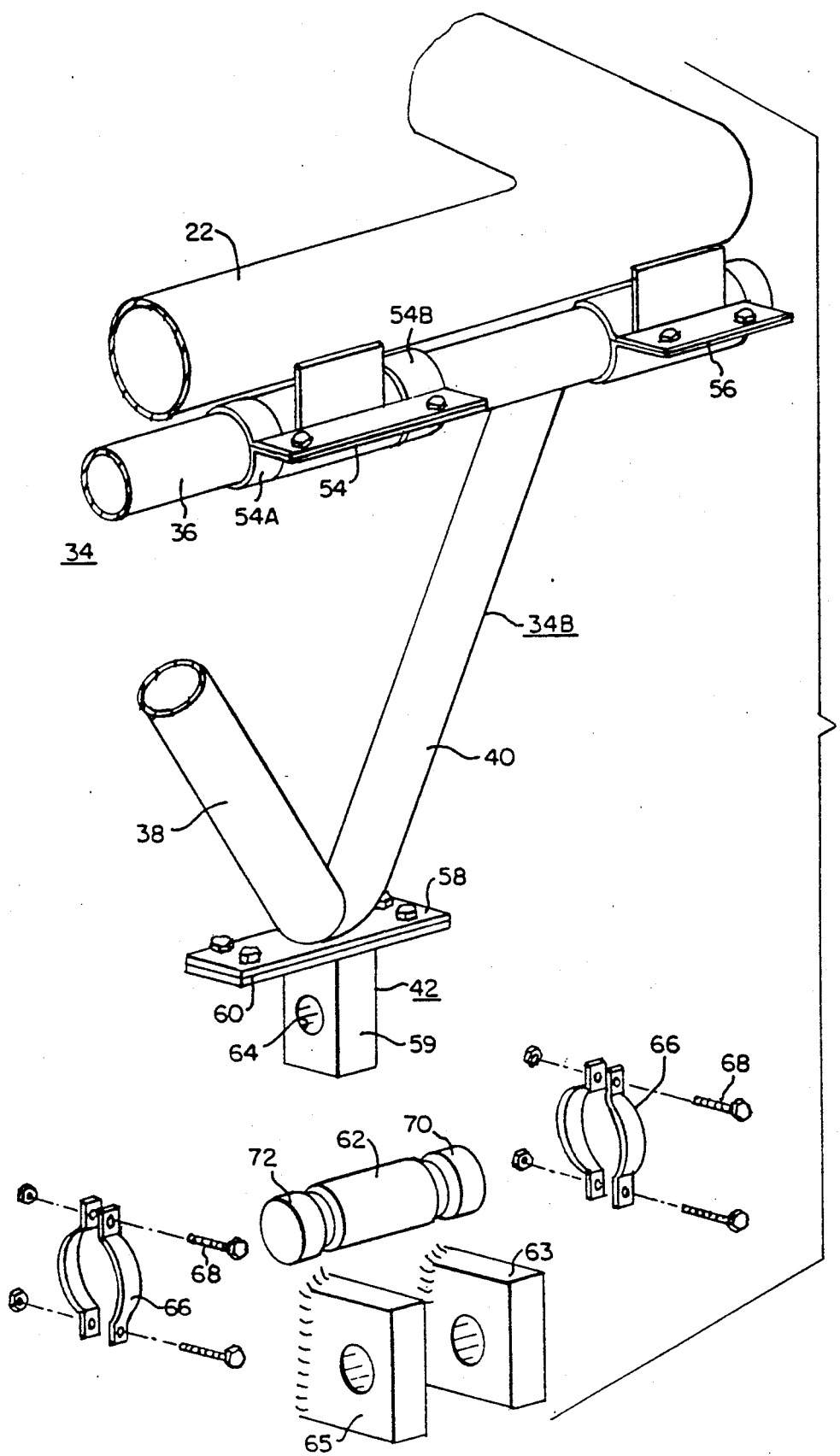
FIG. 7 shows an exploded schematic view, partially broken away, illustrating pin support employed for the manifold support columns with enlarged detail.

Since the columnar supports undergo no bending moments in accordance with the operation of the invention, no bending moments are applied to the lugs and lug twisting is avoided. As shown in prior art FIG. 12, twisting of lugs 26A typically occurs as indicated by dotted lines 26T under applied manifold horizontal forces or vertical moments.

Reduced lug loading is thus achieved through avoidance of lug bending moments and the transference of load forces to the lugs as shear forces.

What is claimed is:

1. In a nuclear power plant including a pressurizer having a generally cylindrical vessel wall topped with a dome-like member, a relief and safety valve system having a manifold generally located above and extending about the periphery of the vessel wall of the pressurizer, and an arrangement for supporting the relief and safety valve system, said valve supporting arrangement comprising:

a plurality of lug means extending outwardly from and secured to said vessel wall at points spaced around the wall periphery;

a plurality of columnar support means, each of said columnar support means extending generally vertically upward from each of said lug means to the manifold;

a plurality of first elongated and generally cylindrical structural members extending generally in the horizontal direction for securing the lower end of each of said columnar support means relative to the associated lug means;

a plurality of second elongated and generally cylindrical structural members extending generally in the horizontal direction for supporting the upper end of each of said columnar support means relative to associated collar means;

a plurality of collar means projecting downwardly from said manifold for support of each of said second elongated structural members; and means for disengaging one of said elongated structural members from its securance so that each of said columnar support means can be pivoted about its other elongated structural member and swung outwardly from said vessel.

2. A valve system support arrangement as set forth in claim 1 wherein:

said first elongated structural member is a structural pin that extends through the associated lug means;

said disengaging means are clamp means that lock said pin relative to said lug means and are removable to permit pin removal from said lug means;

each of said second elongated structural members is a tubular crossbar member secured to said columnar support means and is pivotally supported by said collar means to permit the bottom end of each of said columnar support means to be swung outwardly from the vessel wall about the upper end of such columnar support means.

3. A valve system support arrangement as set forth in claim 2 wherein:

each of said columnar support means includes a generally V-shaped structure having a base portion through which said pin extends to secure said columnar support means to the associated lug means; and a pair of diagonal columns extending upwardly and away from said base portion to said crossbar and secured to said base portion and said crossbar.

4. A valve system support arrangement as set forth in claim 3 wherein:

each of said collar means includes at least three collar units secured to said manifold and disposed about said crossbar of the associated columnar support means.

5. A valve system support arrangement as set forth in claim 4 wherein:

a first of said three collar units of each of said collar means is disposed about a central portion of the crossbar of the associated columnar support means; the other two collar units are located outward on opposite sides of said first collar unit along the crossbar axis; and means are provided for locking said crossbar against unitary horizontal movement relative to said first collar with said crossbar being free to expand and contract axially through sliding movement relative to the two outer collars.

* * * * *